UNITED STATES PATENT OFFICE.

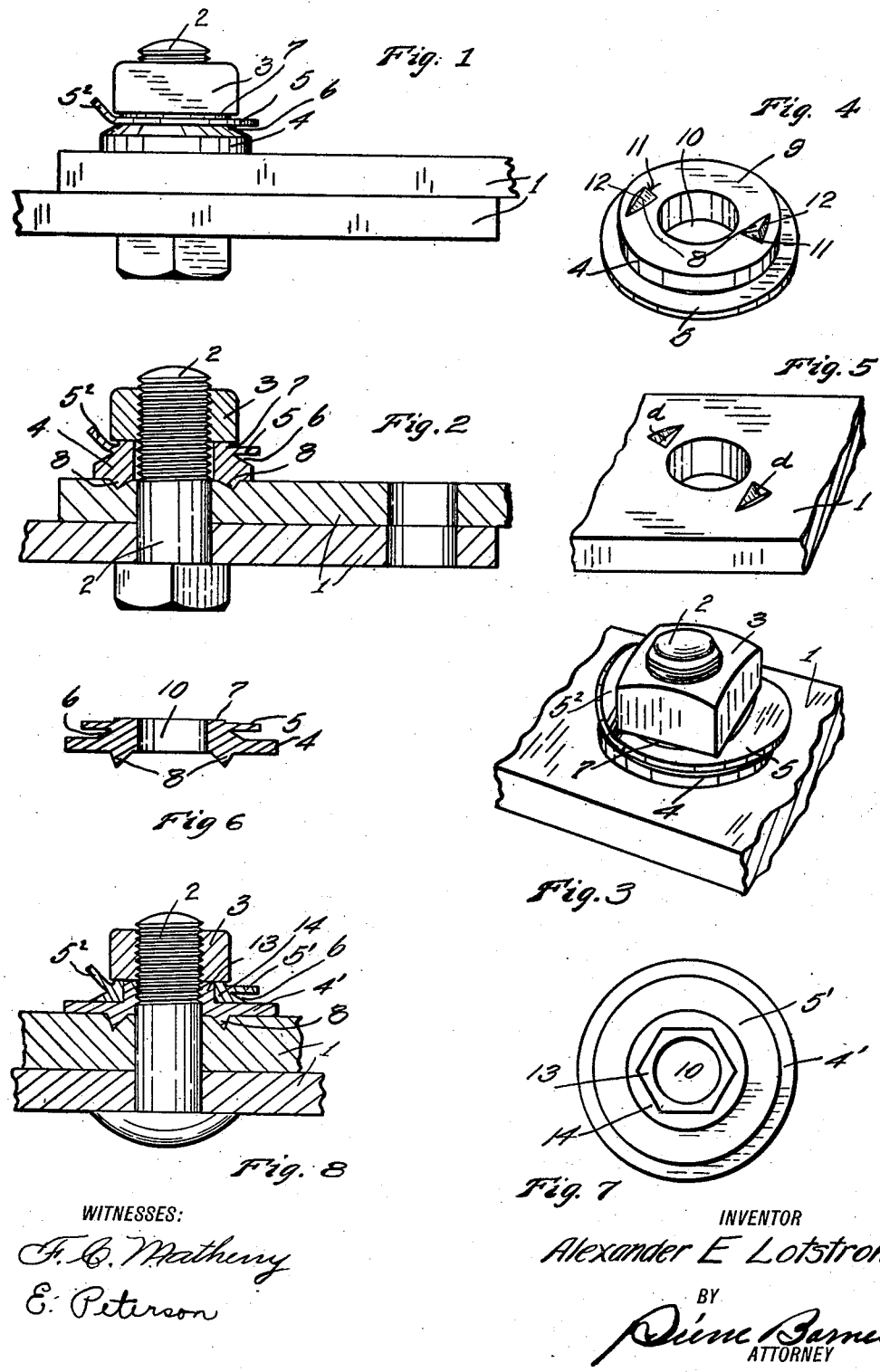

ALEXANDER E. LOTSTROM, OF SEATTLE, WASHINGTON.

NUT-LOCK.

1,071,622.          Specification of Letters Patent.          Patented Aug. 26, 1913.

Application filed November 4, 1912. Serial No. 729,377.

*To all whom it may concern:*

Be it known that I, ALEXANDER E. LOTSTROM, a citizen of the United States, residing at Seattle, in the county of King and State of Washington, have invented certain new and useful Improvements in Nut-Locks, of which the following is a specification.

This invention relates to improvements in nut-locks; and has for its object the provision of a permanent and safe nut-lock for general purposes while it is particularly adapted for use in connection with railway track joints.

A further object of the invention is to provide a strong, durable and simply constructed nut-lock that is readily applied and efficient in use and that will not cut, damage or render unfit for repeated use the nut or bolt to which applied.
With these objects in view, the invention consists in the novel construction of a bolt washer provided with means for positive securement to the bolted work against relative rotation in combination and adaptation with improved devices for locking the nut therewith.

The invention further consists in the novel construction, combination and adaptation of parts, as illustrated in the accompanying drawings, described in the following specification and finally set forth in the appended claims.

In said drawings, Figure 1 is a side elevation of devices embodying my invention.
Fig. 2 is a sectional view of the same. Fig. 3 is a perspective view of a similar construction shown in the preceding views. Fig. 4 is a detached underside perspective view of the form of nut-lock shown in the preceding views. Fig. 5 is a fragmentary perspective view of a plate upon which one of said nut-locks has been bolted which, in connection with the preceding view, illustrates the manner of joining the nut-lock to the work.
Fig. 6 is a cross-sectional view of a modified form of the nut-lock shown detached. Fig. 7 is a top plan view of another modified form of nut-lock; and Fig. 8 is a sectional view of the form shown in Fig. 7, shown in operative position.

Referring to Figs. 1 to 5, inclusive, of the drawings, the reference numeral 1 designates the several plates comprising the work to be secured together, and 2 the threaded bolt;
and 3 the nut therefor of ordinary or suitable construction.

According to my invention, the nut-lock is comprised of a base 4, preferably of circular configuration, and an integral superposed flange 5 of somewhat larger diameter than said base. Said flange is undercut by an annular recess 6 desirably of reëntrant angular configuration in section whereby the upper and lower opposing surfaces of said flange are in substantially parallel planes.
Slightly raised above said upper plane surface of the flange 5 is a concentrically disposed integral boss 7 of diameter somewhat less than the inner extremity of said recess 6.

Numeral 8 indicates a pair of pyramidal projections from the plane bottom surface 9 of said base upon opposite sides of the axially disposed bolt opening 10. Said projections have preferably a triangular base and are each provided with a side 11 in nearly vertical relation with said surface 9 and the angular ridge 12 bounding the remaining two sides relatively long and tangent with the circumference of said base. In each projection the nearly vertical side 11 is so disposed that it will face in the direction reversely to the direction in which the nut 3 is turned in screwing upon a bolt and when set will thus offer greater resistance to said nut turning in such reverse direction accidentally or otherwise.

The embodiment of my invention just described and illustrated in Figs. 1 to 5 is of a type especially designed for use in bolting metal plates or structures together and especially malleable iron or steel fish plates of railway tracks. In process of manufacture of such nut lock devices the projections 8 may be hardened to a degree that will enable them to penetrate the softer metal of the work upon which engaged, as illustrated in various of said views and particularly and separately shown in Fig. 5, the depressions caused by said projections being indicated by the reference character $d$. Said hardening may be communicated to the base 4 but not the flange 5 as will be made clear hereinafter.

Referring now to Fig. 6, wherein an embodiment of my invention is illustrated more particularly adapted for use on bolts for wooden structures, it will be noted that the base 4 is of relatively larger diameter than that heretofore described and extends beyond the superposed flange 5 to afford a larger area of bearing surface upon the work. The altitude of the pyramidal projections 8 may also be somewhat greater than of the forms adapted for use upon metal structures.

In Figs. 7 and 8 are illustrated the nut-lock according to my invention comprised of two parts to facilitate manufacture; of which the base $4^1$ is formed with an axially disposed poly-angular stud 13. The flange portion $5^1$ is formed integral with an annulus 14 having an axially arranged poly-angular opening adapted to fit tightly over said stud 13. When thus forced upon said stud the parts thereof form a practically integral construction and mutually conform to the respective parts and perform the same functions of the devices already shown and described.

In using my invention, the nut lock is positioned over the bolt and with the projections 8 of the base 9 in contact with the structure to be bolted in the manner of a washer. The nut may then be screwed down upon the bolt in contact with the nut-lock when it bears upon the boss 7. Further screwing of the nut by means of a wrench will cause the projections 8 to penetrate and sink into and below the surface of the bolted structure and is continued until the base surface 9 is in close contact with said structure. The flange 5 is of relatively soft material and is thereupon bent upwardly at a selected position about its circumference on a line forming a chord with reference to said circumference and parallel with one of the vertical plane surfaces of said nut, as at $5^2$, in the several views. Said upwardly bent portion $5^2$ may be brought into as close contact with the nut face as desired but experience proves that an angular relation of forty-five degrees from the horizontal is sufficient to prevent said nut from turning independently of the nut-lock, as a whole, owing to the interference of said flange portion $5^2$. One such bent portion is usually sufficient to accomplish the result desired but additional sides of the nut may be similarly treated. Any tool or implement having an edge adapted to enter the recess 6 may be employed to effect said bend in the flange. The position of said boss 7 above said flange 5 and radially inward of the innermost edge of said recess 6 renders said flange readily bent in an upward direction and less easily fractured at its point of flexure than otherwise.

When the devices described have been assembled in the manner set forth, the nut is locked against any possibility of dislodgment except by violent means. Vibration or ordinary accidents will not effect the security of the nut in its adjusted position. The nut-lock is securely anchored to the work by the projection 8 and the nut is prevented from reverse rotation by said element $5^2$ without dislodgment of the nut-lock as a whole. The provision of the nearly vertical side 11 and its preferred position relative to the direction in which the nut is turned in unscrewing the same, is not deemed essential to the efficient working of the device but is a feature that may be advisably incorporated in the design. To remove the bolt from the work, all that is required is to press downwardly the portion $5^2$ to permit the nut being turned in a reverse direction and disengaged from the bolt whereupon the nut-lock and the bolt may be removed.

Among the advantages of the present invention are the evident simplicity of its construction and the proportioned strength and consequent durability of the device in its several parts according to the work they are adapted to perform. Another advantage resides in the adaptability of the nut-lock to bolts and nuts of standard design and common use without any change or modification thereof nor will any change or damage take place upon the bolt or nut by reason of the use of this invention so that these devices may be repeatedly used as occasion may require. Still another advantage resides in my invention that no special tools are required or desirable as a wrench of ordinary design is sufficient together with a bladed tool, as a chisel, to set the flange portion $5^2$. Save for the last mentioned operation, the device is set in operative condition merely by screwing down a nut upon the nut-lock as upon an ordinary washer, thus making a considerable saving in time and labor over methods sometimes employed.

While I have described my invention with some detail, I do not wish to be understood as confining myself to the precise construction shown as obviously changes and modifications may be made in such details within the scope of the claims without departing from the spirit of the invention or sacrificing its advantages.

Having described my invention, what I claim and desire to secure by Letters-Patent of the United States, is—

1. A nut-lock comprising a base having a lower plane surface, integral projections extending from said surface, a superposed flange rigidly connected to said base, and having its outer perimeter separated from said base by an annular recess.

2. A nut-lock comprising a base having a lower plane surface and a centrally arranged aperture, integral projections extending from said surface upon opposite sides of said aperture, a superposed flange rigidly connected to said base affording an annular recess therebetween, and an axially arranged boss extending upwardly from said flange.

3. A nut-lock comprising a base having a lower plane surface and a centrally arranged aperture, integral projections extending from said surface, a poly-angular integral stud extending upwardly from said base, an annular body having a centrally arranged poly-angular opening adapted to fit over said stud, said body having a flange extending in planes parallel with said surface.

4. A nut-lock comprising a base having a lower plane surface and a centrally arranged aperture, integral projections extending from said surface, a superposed flange rigidly connected to said base affording an annular recess therebetween, and an axially arranged boss about said aperture extending upwardly from said flange of less diameter than the innermost edge of said recess.

Signed at Seattle, Wash., this 23rd day of October, 1912.

ALEXANDER E. LOTSTROM.

Witnesses:
F. C. MATHEMY,
E. PETERSON.